Patented June 15, 1948

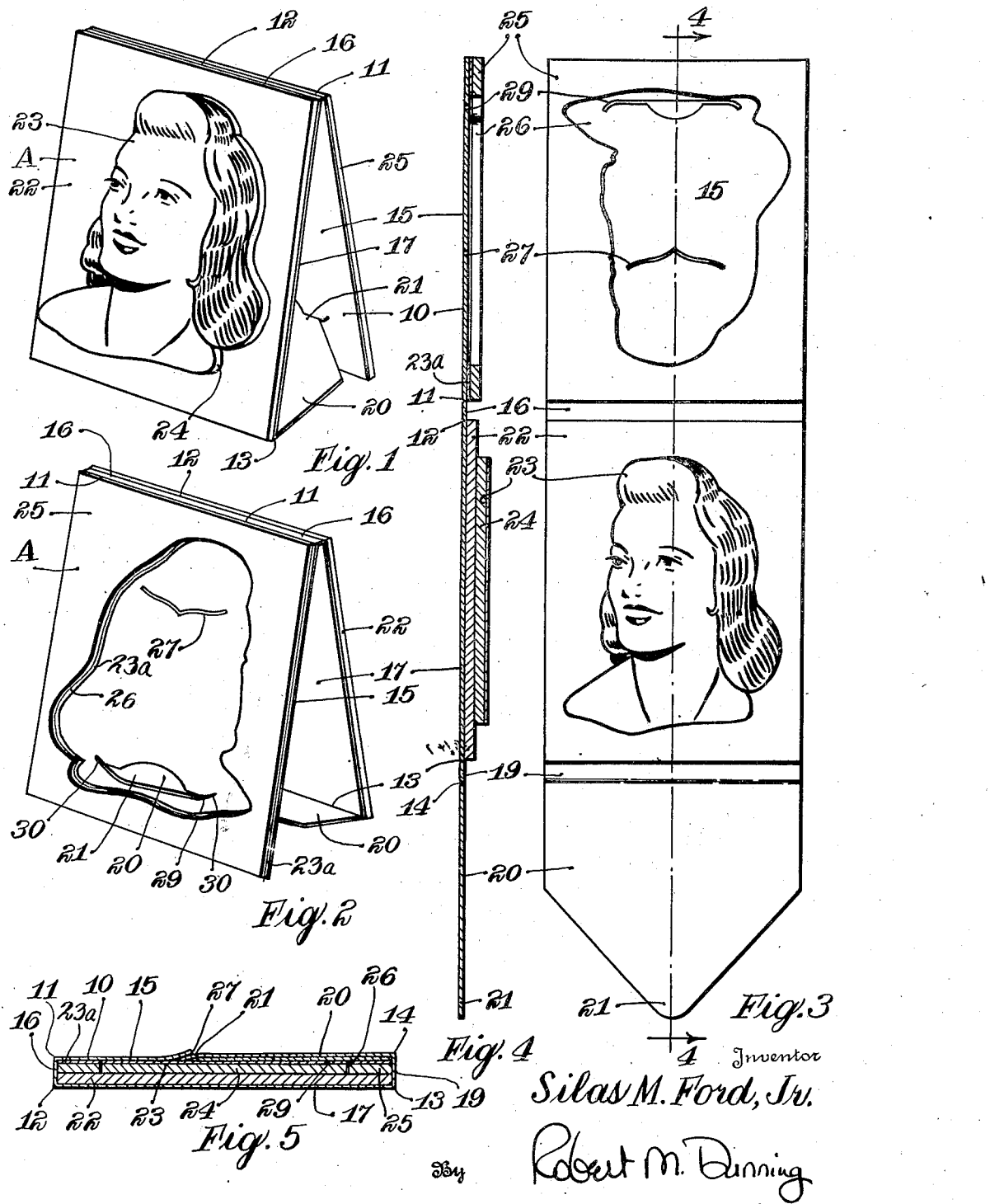

2,443,234

UNITED STATES PATENT OFFICE 2,443,234

FOLDABLE PICTURE FRAME

Silas M. Ford, Jr., St. Paul, Minn., assignor of one-half to Gilbert Hamm, St. Paul, Minn.

Application July 2, 1943, Serial No. 493,208

8 Claims. (Cl. 40—152.1)

1

My invention relates to an improvement in foldable picture frame, wherein it is desired to provide a novel and attractive means of mounting and containing a photograph or portrait.

An object of the present invention is to provide a photograph carrier which acts to provide an extremely lifelike appearance when in display position, and which acts to protect the photograph from injury while the same is being carried. My frame is accordingly suitable for use by members of the armed forces who must carry photographs from place to place and are usually desirous of preventing the same from becoming soiled or injured.

A feature of the present invention lies in the mounting of a photograph upon a background of considerable thickness and in protecting the photograph or portrait by containing the same in a receptacle which fits the outer shape of the mounted photograph. As a result the edges of the photograph are protected from injury while the same is being carried from place to place.

A further feature of the present invention lies in the mounting of a photograph on a mounting board of substantial thickness, in cutting out the photograph about the outline thereof, and in mounting the cut-out photograph upon a backing sheet of substantial thickness. As a result the photograph stands out from the backing board and presents an extremely life-like appearance.

A further feature of the present invention lies in the formation of an easel type support which acts to enclose the photograph in folded position thereof, and which acts to support the photograph in display position in unfolded relation thereof. In preferred form this support comprises an elongated flexible strip having a rear panel, a front panel, and a tongue arranged to connect the panels and to lock the same in either folded or unfolded relation. The rear panel of the easel supports the picture frame with its irregular cut-out aperture therein. The front panel supports the photograph mounted upon its mounting board and cut-out about its irregular outline. The photograph fits the aperture in closed position of the easel and is preferably mounted upon a reinforcing plate covering the surface of the front panel.

These and other objects and novel features of my invention will be more clearly and fully set forth in the following specification and claims.

In the drawings forming a part of my specification:

2

Figure 1 is a perspective front view of the picture frame in display position.

Figure 2 is a perspective rear view of my picture frame in display position.

Figure 3 is a plan view of the picture frame laid out in frame formation.

Figure 4 is a sectional view of the picture frame in flat formation, the position of the section being indicated by the line 4—4 of Fig. 3.

Figure 5 is a sectional view through the picture frame in folded position.

The picture frame A includes a flexible strip 10 which is foldable along spaced parallel transverse fold lines 11, 12, 13, and 14. As a result the frame may fold from the position illustrated in Figure 4 of the drawings to the position illustrated in Figure 5 thereof.

The fold lines in the strip 10 divide the strip into a pair of panels, a connecting portion, and a locking tongue portion. The area between the fold line 11 and the adjacent end of the strip 10 forms a rear panel 15. The area between the fold lines 11 and 12 forms a connecting portion 16. The area between the parallel fold lines 12 and 13 forms a front panel 17. The area between the spaced fold lines 13 and 14 forms a second connecting portion 19. The area between the fold line 14 and the adjacent end of the strip 10 forms the locking tongue portion 20. This locking tongue portion 20 is preferably provided with a pointed or rounded end 21, as best illustrated in Figure 3 of the drawings.

Mounted upon the front panel 17 of the strip 10, I preferably provide a reinforcing panel 22 which substantially fills the entire area of the front panel 17 between the fold lines 12 and 13, and between the opposed edges of the strip 10. This panel 22 may be of any suitable substantially rigid material such as ply-wood, cardboard, leather, fiber, or the like, and acts as a background for the photograph or portrait.

A photograph 23 of a size substantially equal to that of the reinforcing panel 22 has its center portion adhered to a backing sheet 24. The backing sheet 24, and the portion of the photograph adhered thereto, is the size and shape of the important portion of the photograph; and the mounting of the photograph upon the thick backing sheet causes it to stand out from the reinforcing panel 22.

The marginal portion 23a of the photograph is adhered to the frame portion 25. This frame portion 25 is adhered to the panel 15 with the marginal portion 23a of the photograph sandwiched between the frame portion 25 and the panel 15.

The panel from which the frame portion 25 and backing sheet portion 24 are cut may be formed of ply-wood, leather, fiber, cardboard, or other suitable material.

The frame 25 is so positioned that upon folding the strip 10 along the fold lines 11 and 12, the photograph or portrait 23 is folded into the apertures 26 in the frame member 25. As a result the edges of the portrait and mounting board are protected in folded position of the frame by the frame 25.

The tongue portion 20 of the strip 10 is arranged to hold the strip in either folded or display position. The pointed or rounded end 21 of the strip 10 is engageable in a slot 27 in the rear panel 15, as illustrated in Figure 5 of the drawings when the frame is in folded relation. In order to support the frame in display position as an easel, this same pointed or rounded strip end 21 is engageable in a second slot 29 through the rear panel 15, as illustrated in Figures 1 and 2 of the drawings, the friction of the edges of the slot 29 holding the tongue 20 firmly in place. It will be noticed that the ends 30 of the slot 29 are curved to some extent, thereby curving the tongue 21 and thus creating a tighter engagement between the tongue and the slot.

In the formation of my frame, I first mount the photograph upon a surface of a panel comprising backing 24 and the frame board 25 and I then cut out around the outline of the portrait by any suitable means, such as by use of a jigsaw, or the like. I then mount the photograph and the portion 24 to which it is attached upon the mounting board 22, so that when the frame 25 is in contiguous relation with the board 22, the photograph 23 and its mounting portion 24 will lie within the aperture 26 formed by cutting the periphery of the picture 23.

I then adhere the strip 10 to the mounting board panel 22 and to the photograph covered surface of frame 25, care being taken not to permit adhesive to contact any portion of the photograph 23 or its mounting board portion 24. The frame 25 is mounted at one end of the strip 10 and the panel 22 is mounted in spaced relation thereto so that when the strip 10 is folded along its fold lines 11, 12, 13, and 14, the frame 25 will be positioned in contiguous relation with the panel 22, and the photograph will be locked in its recess 26. The locking tongues 20 may then be engaged in the slot 27 to hold the frame in closed position. By merely removing the locking tongue portion 20 from its slot 27 and unfolding the strip 10 along its fold lines 11, 12, 13, and 14, the locking tongue 20 may engage in the slot 29 to hold the front and rear panels of the strip 10 in easel position. When in this position the frame 25 is located on the rear panel of the easel where it is not readily visible and the photograph stands out in relief from its background panel 22. The term "photograph" designates any suitable picture or portrait which may be used.

In accordance with the patent statutes, I have described the principles of construction and operation of my foldable picture frame, and while I have endeavored to set forth the best embodiments thereof, I desire to have it understood that obvious changes may be made within the scope of the following claims without departing from the spirit of my invention.

I claim:

1. A foldable picture frame comprising an elongated strip of flexible material, transverse fold lines in said strip to divide said strip into a pair of spaced panels, a relatively rigid frame secured to one of said panels and having an aperture therein, a picture mounted on the other of said panels designed to extend into said aperture in said frame when said panels are folded together, a locking tongue at one end of said strip, and slot means in said strip adjacent the other end thereof for receiving said locking tongue to hold said panels in folded position with said picture in said recess, or to hold said panels in easel relationship.

2. A foldable picture frame comprising a flexible strip forming a pair of panels flexibly connected to fold into or out of superimposed relation, a block of irregular outline and of substantial thickness mounted on one of said panels spaced from the outline edges of the panel, a frame mounted on the other of said panels, said frame having an irregular aperture therein spaced from the outline edges of the frame and designed to fit about said block when said panels are folded together, said block and frame being of substantially identical thickness, and a photograph, the center portion thereof being secured to said block and the margins thereof being secured between said frame and said strip.

3. A foldable picture frame comprising a pair of panels flexibly connected together to fold into or out of superimposed relation, a picture of substantial thickness secured to one of said panels in spaced relation to the edges of said one panel, and a frame of a thickness substantially equal to that of the picture secured to the other of said panels, said frame having an aperture therein spaced from the edges of the frame and located to receive said picture when said panels are folded into superimposed relation.

4. A foldable picture frame comprising a pair of panels flexibly connected together to fold into or out of superimposed relation, a reinforcing panel secured to one of said panels and substantially coextensive therewith, a picture of substantial thickness secured to said reinforcing panel in spaced relation to the edges of said reinforcing panel, and a frame of a thickness substantially equal to that of the picture secured to the other of said panels, said frame having an aperture therein spaced from the edges of the frame and located to receive said picture when said panels are folded into superimposed relation.

5. A foldable picture frame comprising a pair of panels flexibly connected together to fold into or out of superimposed relation, a picture of substantial thickness secured to one of said panels in spaced relation to the edges of said one panel, said picture comprising a relatively thick body portion and a relatively thin photograph adhered thereto, and a frame of a thickness substantially equal to that of the picture secured to the other of said panels, said frame having an aperture therein spaced from the edges of the frame and located to receive said picture when said panels are folded into superimposed relation.

6. A foldable picture frame comprising a pair of panels flexibly connected together to fold into or out of superimposed relation, a photograph of substantial thickness secured to one of said panels in spaced relation to the edges of said one panel, said photograph comprising a relatively thick body portion and a relatively thin photograph adhered thereto, and a frame of a thickness substantially equal to that of the photograph secured to the other of said panels, said frame comprising a relatively thick body and a relatively thin photograph secured thereto and secured in face contacting relation to said other panel, said frame having an aperture therein spaced from the edges of the frame and located to receive said picture when said panels are folded into superimposed relation.

7. A foldable picture frame comprising a pair of panels flexibly connected together to fold into or out of superimposed relation, a reinforcing panel secured to one of said panels and substantially coextensive therewith, a picture of substantial thickness secured to said reinforcing panel in spaced relation to the edges of said reinforcing panel, said picture comprising a relatively thick body portion and a relatively thin photograph adhered thereto, and a frame of a thickness substantially equal to that of the picture secured to the other of said panels, said frame having an aperture therein spaced from the edges of the frame and located to receive said picture when said panels are folded into superimposed relation.

8. A foldable picture frame comprising a pair of panels flexibly connected together to fold into or out of superimposed relation, a reinforcing panel secured to one of said panels and substantially coextensive therewith, a photograph of substantial thickness secured to said reinforcing panel in spaced relation to the edges of said reinforcing panel, said photograph comprising a relatively thick body portion and a relatively thin photograph adhered thereto, and a frame of a thickness substantially equal to that of the picture secured to the other of said panels, said frame comprising a relatively thick body and a relatively thin photograph secured thereto and secured in face contacting relation to said other panel, said frame having an aperture therein spaced from the edges of the frame and located to receive said picture when said panels are folded into superimposed relation.

SILAS M. FORD, Jr.

REFERENCES CITED

The following references are of record in the file of this patent:

UNITED STATES PATENTS

| Number | Name | Date |
| --- | --- | --- |
| 291,921 | McArthur | Jan. 15, 1884 |
| 683,296 | Konrad | Sept. 24, 1901 |
| 1,414,656 | Diaz | May 2, 1922 |
| 1,602,583 | Lawrence | Oct. 12, 1926 |
| 1,755,222 | Minnick | Apr. 22, 1930 |
| 2,247,150 | Chilcote | June 24, 1941 |
| 2,303,328 | Cross | Dec. 1, 1942 |